United States Patent
Anderson et al.

(10) Patent No.: US 10,705,673 B2
(45) Date of Patent: Jul. 7, 2020

(54) POSTURE AND INTERACTION INCIDENCE FOR INPUT AND OUTPUT DETERMINATION IN AMBIENT COMPUTING

(71) Applicant: Intel Corporation, Santa Clara, CA (US)

(72) Inventors: Glen J. Anderson, Beaverton, OR (US); Giuseppe Raffa, Portland, OR (US); Sangita Sharma, Portland, OR (US); Carl S. Marshall, Portland, OR (US); Meng Shi, Hillsboro, OR (US); Selvakumar Panneer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 15/721,768

(22) Filed: Sep. 30, 2017

(65) Prior Publication Data

US 2019/0102047 A1   Apr. 4, 2019

(51) Int. Cl.
*G06F 3/0481*   (2013.01)
*G06F 16/23*   (2019.01)
*G06F 3/01*   (2006.01)

(52) U.S. Cl.
CPC ............ *G06F 3/0481* (2013.01); *G06F 3/011* (2013.01); *G06F 16/23* (2019.01)

(58) Field of Classification Search
CPC .................................................. G06F 3/0482
See application file for complete search history.

(56) References Cited

U.S. PATENT DOCUMENTS

| | | | | |
|---|---|---|---|---|
| 9,609,262 | B2* | 3/2017 | Kwong | H04N 9/3182 |
| 2008/0018591 | A1* | 1/2008 | Pittel | G06F 1/1616 |
| | | | | 345/156 |
| 2009/0115721 | A1* | 5/2009 | Aull | G06F 3/017 |
| | | | | 345/156 |
| 2010/0225450 | A1* | 9/2010 | Fischer | G06Q 10/06 |
| | | | | 340/10.4 |
| 2011/0075055 | A1* | 3/2011 | Bilbrey | H04N 5/74 |
| | | | | 348/744 |
| 2011/0149094 | A1* | 6/2011 | Chen | H04N 5/23248 |
| | | | | 348/208.3 |
| 2011/0164226 | A1* | 7/2011 | Wu | H04N 9/3173 |
| | | | | 353/70 |
| 2011/0243380 | A1* | 10/2011 | Forutanpour | G06F 3/017 |
| | | | | 382/103 |

(Continued)

*Primary Examiner* — Scott T Baderman
*Assistant Examiner* — Mario M Velez-Lopez
(74) *Attorney, Agent, or Firm* — Jordan IP Law, LLC

(57) ABSTRACT

Systems, apparatuses and methods for technology that provides smart work spaces in ubiquitous computing environments. The technology may determine a task to be performed in a smart work space and perform task modeling, wherein the task modeling includes determining one or more user interfaces involved with the task. One or more placements may be determined for the one or more user interfaces based on one or more ergonomic conditions, an incidence of an interaction, and a length of time of interaction. The technology may position the one or more user interfaces into the smart work space in accordance with the determined one or more placements.

25 Claims, 12 Drawing Sheets

(56) References Cited

U.S. PATENT DOCUMENTS

| | | | | |
|---|---|---|---|---|
| 2015/0278687 A1* | 10/2015 | Sculley, II | ............ | G05B 13/00 |
| | | | | 706/47 |
| 2016/0187991 A1* | 6/2016 | Hung | ...................... | G06F 3/017 |
| | | | | 345/156 |
| 2018/0150186 A1* | 5/2018 | Norieda | ................ | G06F 3/0346 |
| 2018/0348615 A1* | 12/2018 | Sakai | ................... | G03B 21/206 |

* cited by examiner

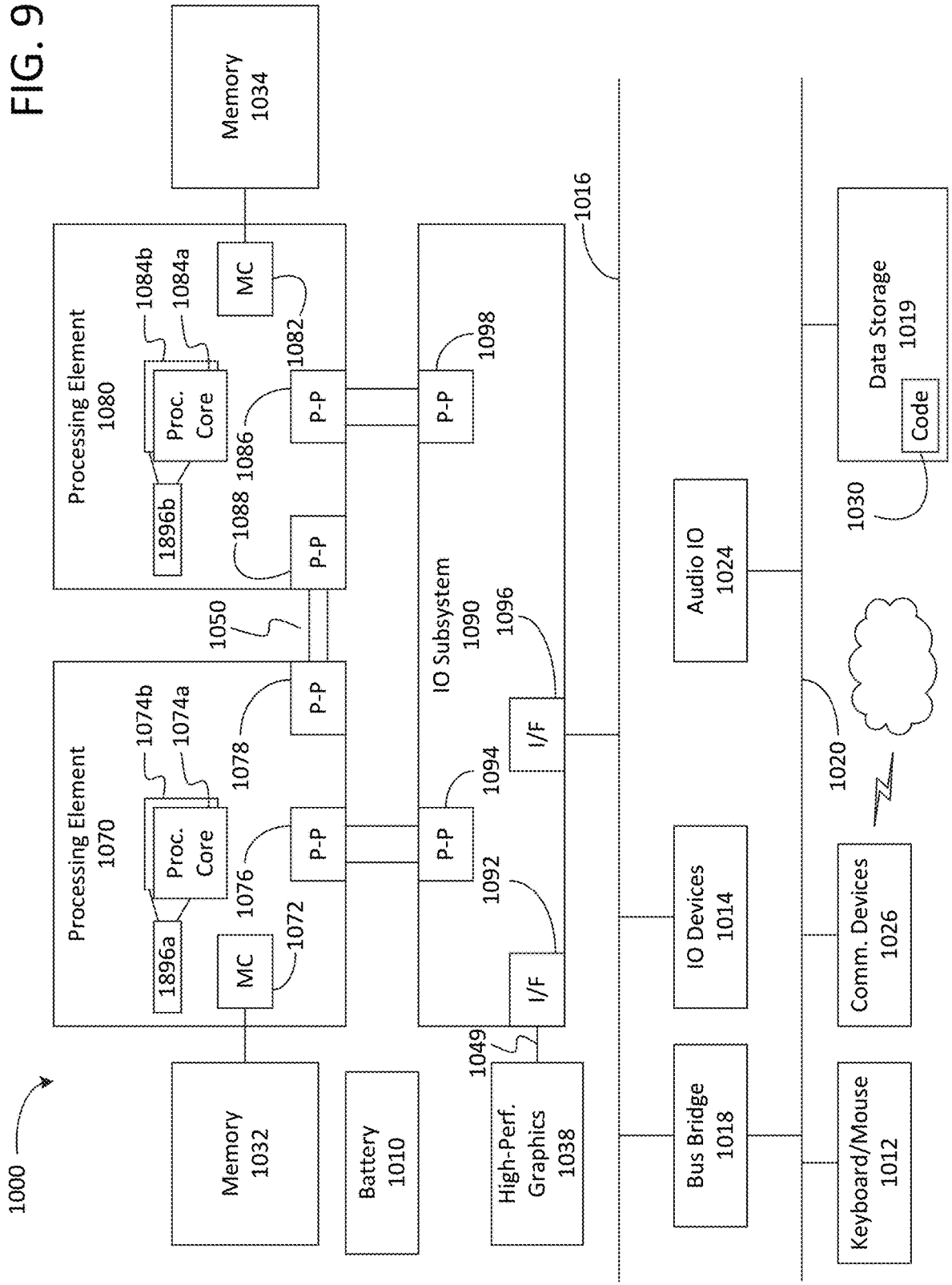

POSTURE AND INTERACTION INCIDENCE FOR INPUT AND OUTPUT DETERMINATION IN AMBIENT COMPUTING

TECHNICAL FIELD

Embodiments generally relate to monitoring and adapting computing environments/smart work spaces to provide healthy interactions for the users. More particularly, embodiments relate to monitoring and adapting ergonomics in ubiquitous computing environments/smart work spaces with inputs and outputs that are mobile, distributed, and dynamic to provide healthy interactions for the individuals that use them.

BACKGROUND

Conventional ergonomic solutions may monitor the posture of an individual within a workstation and alert the individual to make adjustments. Additional ergonomic challenges may occur, however, in ubiquitous computing environments where inputs and outputs are mobile, distributed, and dynamic.

BRIEF DESCRIPTION OF THE DRAWINGS

The various advantages of the embodiments will become apparent to one skilled in the art by reading the following specification and appended claims, and by referencing the following drawings, in which:

FIG. 9 is a block diagram of an exemplary computing system according to an embodiment.

Figure 1:
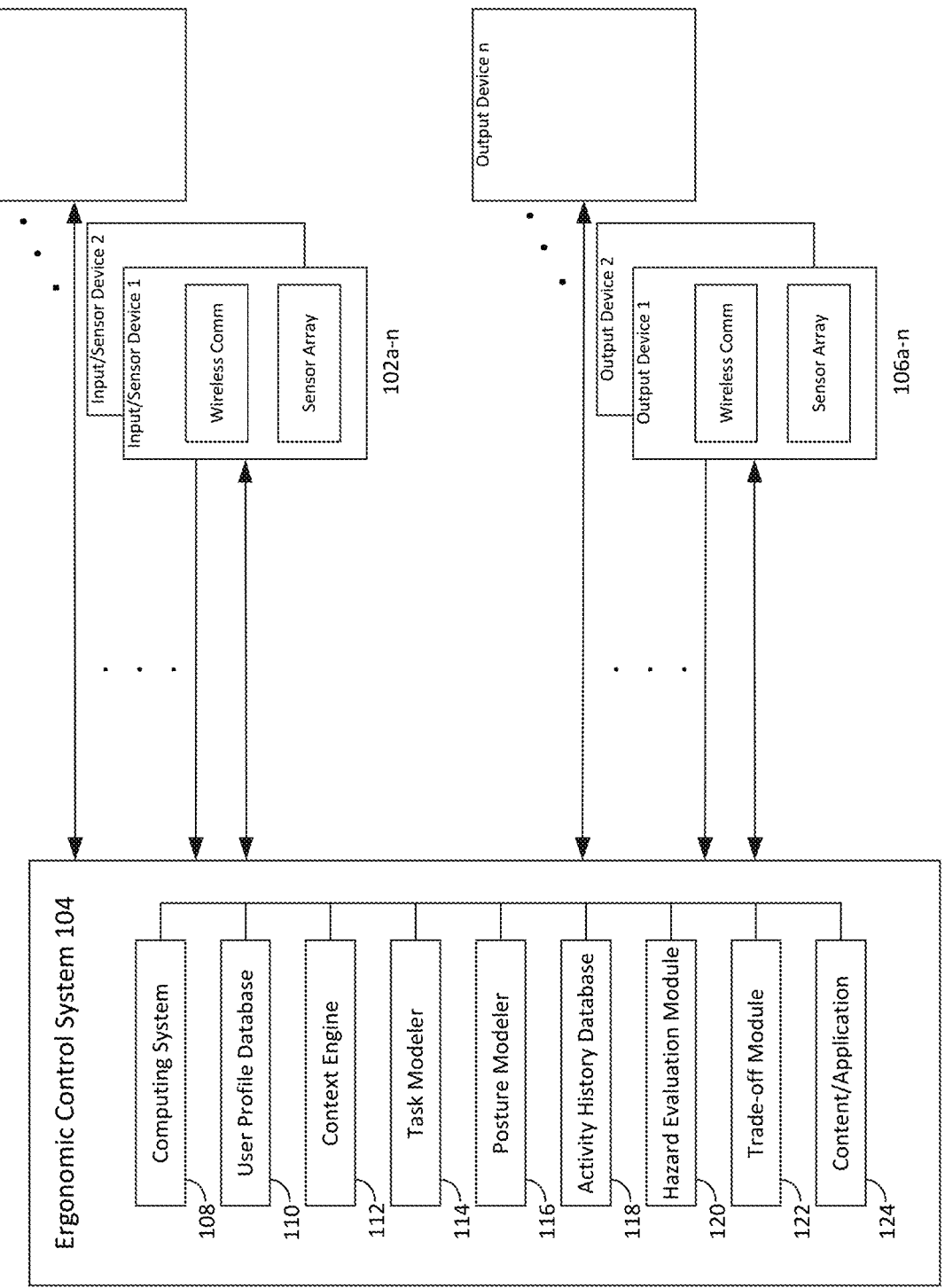
FIG. 1 is a block diagram of an example of an ergonomic system architecture that monitors and adjusts a user's smart work space to provide healthy ergonomic and comfortable interactions according to an embodiment.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

DESCRIPTION OF EMBODIMENTS

Technology to monitor and adapt ergonomics in ubiquitous computing environments/smart work spaces is described herein. A system may monitor users in smart work spaces, taking into account ergonomic and comfort factors when determining when and where to project inputs and outputs within the smart work spaces to provide a ubiquitous computing environment. The system may balance ergonomics against convenience based on incidence and length of time of interactions to promote good posture and prevent repetitive trauma (injuries that occur over time because of repeated bad actions). In some embodiments, a system may include one or more processors and one or more modules to be executed by the one or more processors to provide a dynamic and ergonomically sound smart work space well suited for its users. In another embodiment, a semiconductor package apparatus may include a substrate with logic coupled to the substrate, the logic to provide a dynamic and ergonomically sound smart work space well suited for its users.

Human characteristics, such as, but not limited to, height, weight, body proportions, and health conditions of the users may be taken into account when determining the placement of inputs and outputs to provide healthy interactions between the users and the system. Characteristics of the smart work spaces and the type of tasks being performed, such as, but not limited to, length of time of interactions, incidence/rate of interactions, location of the user(s), height differences among multiple users, body posture, neck position, viewing distance and direction of activity and relevant objects, potential for repetitive trauma (injuries that occur over time because of repeated bad actions), etc., may also be taken into account when determining the placement of inputs and outputs to provide healthy interactions between the users and the system. These and other aspects of the present disclosure will be more fully described below.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

FIG. 1 is a block diagram of an ergonomic system architecture 100 that monitors and adjusts a user's smart work space to provide healthy ergonomic and comfortable interactions according to an embodiment. The illustrated ergonomic system architecture 100 includes a plurality of input devices 102a-n, an ergonomic control system 104, and a plurality of output devices 106a-n. The input devices 102a-n and the output devices 106a-n may be considered interfaces to the smart work space. Each of the input devices 102a-n may be coupled to the ergonomic control system 104 over a wireless network. The illustrated ergonomic control system 104 may be coupled to each of the plurality of output devices 106a-n over the wireless network.

The input devices 102a-n may include sensors, cameras, microphones, chemical sensors, proximity sensors, keyboards, touch surfaces, projected input devices, etc., or any combination thereof. Cameras may include various types, such as, for example, two-dimensional (2D), three-dimensional (3D), depth, arrays, and/or fish-eye cameras. In one embodiment, the input devices 102a-n may include single sensors forming a wireless sensor network, with each sensor spatially distributed within the smart space to monitor physical and/or environmental conditions. Each sensor may have the ability to pass its data through the network to the ergonomic control system 104. Information from the ergonomic control system 104 may also be passed to the input devices 102a-n. In another embodiment, input devices 102a-n may include arrays of sensors forming a wireless sensor network, with each array spatially distributed within the smart space to monitor physical and/or environmental conditions. Yet, in another embodiment, the input devices 102a-n may include both single sensors and arrays of sensors. Array sensors may be in a certain geometric pattern, such as, for example, linear and circular, or they may be randomly spaced.

The ergonomic system architecture 100 includes a plurality of output devices 106a-n. Output devices 106a-n may include, but are not limited to, projected displays, liquid crystal displays (LCD), light-emitting diode (LED) displays, speakers, smell generators, drones/robots, haptic surfaces, etc., or any combination thereof.

In one embodiment, the ergonomic control system 104 may be an edge server located in the home. In another embodiment, the ergonomic control system 104 may be on a server in the cloud. In yet another embodiment, the ergonomic control system 104 may be on a local server at a company, university, college, or any entity having at least one smart work space.

The ergonomic control system 104 comprises a computing system 108, a user profile database 110, a context engine 112, a task modeler 114, a posture modeler 116, an activity history database 118, a hazard evaluation module 120, a trade-off module 122, and an application 124 (e.g., providing content and/or information).

The computing system 108 may be used to perform user recognition using various means, such as, for example, video and audio. In one embodiment, user recognition may occur using video. In such an embodiment, an image of a user may be taken via a video source, such as, for example, one or more cameras from the input devices 102a-n, and face recognition techniques may be performed on the image to identify the user. Face recognition techniques are well known to those skilled in the relevant art(s). In another embodiment, user recognition may occur using audio. In such an embodiment, a user's voice may be captured via a microphone source, such as, for example, one or more microphones from the input devices 102a-n, and speaker recognition techniques may be performed on the voice captured to identify the user. Speaker recognition techniques are also well known to those skilled in the relevant art(s).

The computer system 108 may also create user profiles for a newly recognized user. User profiles may include body dimension information, such as, for example, estimated height, weight, and age, health issues, such as, for example, hearing and vision, and other personal information. User profiles may be stored in the user profile database 110. The computer system 108 may also update user profiles periodically. The updates may be done manually by the user or with the help of an administrator for the ergonomic control system 104, periodically, or automatically when the system detects a change with respect to a user. The computing system 108 is further described below with reference to FIG. 9.

The context engine 112 receives input information from the input devices 102a-n as context information to determine location, identity, activity, and/or time using well-known context aware techniques. The context engine 112 collects the input information, analyzes the information, and provides context information to various components of the ergonomic control system 104 to aid the system 100 in providing ergonomics and comfort to the user(s) of the smart work space. For example, the context engine 112 determines user locations and the activity to be performed within the smart work space. With the information received from one or more camera input devices 102 within the smart work space, the context engine 112 may determine the proximity of one or more users to resources, such as, for example, screens and keyboards within the smart work space. The information from the one or more camera input devices 102 may also allow the context engine 112 to determine the state of a user's hands (i.e., whether a user's hands are messy or clean), obstructions to a user's senses, such as, for example, whether the user is wearing headphones, gloves, or sunglasses, and the availability of wearable or mobile devices the system may leverage. This information may be useful when determining what type of inputs and outputs to provide to a user. For example, one would not want to provide a touch surface if the user's hands are messy. With the information received from one or more microphone input devices 102 within the smart work space, the context engine 112 may detect whether a conversation is taking place. The context engine 112 may also view scheduled activities on a user's calendar. This information may be used, in conjunction with other sensed data, to determine the activity to be performed.

The task modeler 114 may receive input from the application 124 and from the activity history database 118. The input from the application 124 may relate to the task that will be performed. The task determines what information may need to be displayed and what input the user may need to provide. For example, if the task is cooking, then the application may be a recipe. The system will then determine the user interfaces needed to display the recipe to be prepared to the user(s)/cook(s).

The activity history database 118 stores information about how long previous interactions took, such as, for example, how long a user held a specific posture while doing an interaction. The activity history database 118 also stores information on the previous history of injuries caused by a particular posture. This information is also taken into consideration by the posture modeler 116 (to be discussed below) when predicting postures for users to perform an interaction in the smart space.

Task modeler 114 estimates the length of time of interactions and the incidence of interactions based on the activity history. In one embodiment, the task modeler 114 creates a list of potential interaction alternatives for inputs and outputs, including where touch surfaces should be placed as well as the location of projected information. Convenience of the location of the input(s) and output(s) (also referred to as the "user interfaces"), especially proximity to the users, may be strongly considered by the task modeler 114. The ergonomic control system 104 may predict the best input(s) and output(s) (i.e., user interfaces) to use for a given task and continue monitoring the interaction and situational context, in turn, adjusting the locations of the input(s) and output(s) accordingly or providing suggestions and alternatives. For example, in group settings people may come and go or different people may start interacting with the system. Scenarios in which people are moving require constant monitoring and adjusting of the locations of input (s) and output(s) (i.e., user interfaces). Also, when multiple people work together, the system may optimize input(s) and output(s) across all people involved, taking into account each person's characteristics, past histories, and user profiles.

In ambient computing environments, the length of time of an interaction and incidence of a required interaction may vary a great deal. In ambient computing environments where the length of time of an interaction is relatively short and the incidence of a required interaction is minimal, the location of input(s) and output(s) may lean toward convenience rather than ergonomics. In ambient computing environments where the length of time of an interaction is longer and the incidence of a required interaction occurs regularly or repeats several times, the location of input(s) and output(s) may lean toward ergonomically sound decisions rather than convenience. For example, less comfortable outputs, if relatively rare, may be allowed in a trade-off for convenience, safety, visibility, or other factors.

Figure 2:
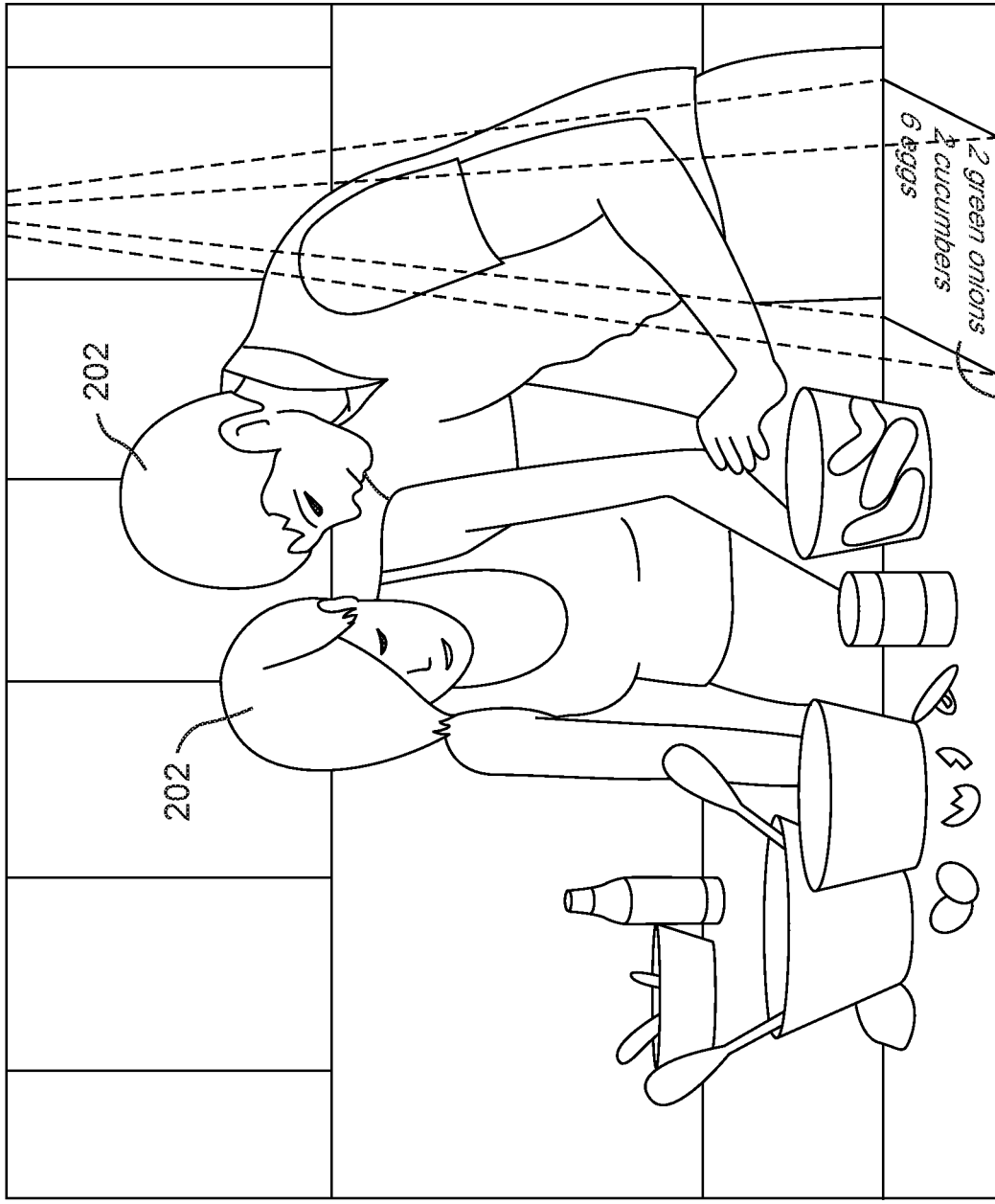
FIG. 2 is an example of a projection from an ambient computing environment in which position of the projection varies by incidence and length of time of the display according to an embodiment.

FIG. 2 is an example of a projection from an ambient computing environment in which position of the projection varies by incidence and length of time of the display according to an embodiment. Shown in FIG. 2 are two individuals 202 performing the task of preparing a recipe. The system identifies the two individuals using video received from an input camera or voice received from an input microphone. The system then retrieves their profiles to determine such things as body characteristics (height, weight, and dimensions), age, health issues, etc. Health issues may include impaired vision (i.e., wears eye glasses), impaired hearing (i.e., wears a hearing aid), use of a cane, walker, or wheelchair, or some other handicap. Note that if an individual is recognized by the system for the first time, the system may automatically create a profile for the newly recognized individual. The system uses the information from the profile to the advantage of the individual. For example, if the profile indicates that an individual wears eye glasses and through an input camera the system is able to sense that the individual is not wearing their glasses, the system may use larger text when displaying output to the individual. In another example, if the profile indicates that an individual is in a wheelchair, the system will use that information to determine where to place input(s) and output (s) and will not place them in an area that is inconvenient for the individual. The system may determine the location of the two individuals and the task to be performed using context information (from the context engine 112). The system also receives content from the application 124. The content may also help define the task to be performed. For example, if the content is a recipe, the system may determine the task to be preparing the recipe. Once the task has been determined, the system may determine what input(s) and output(s) are needed to accomplish the task. The system may retrieve historical data (from the activity history database 118) to predict the incidence and length of the interaction.

The individuals in FIG. 2 do not have any health impairments. Based on the task and the historical data concerning tasks of this nature, the system determined that one projected output is needed, and that is the display of the recipe. The recipe is short, thus providing an indication to the system that the projection of the recipe will only be needed for a short period of time. The recipe instructions are also short, thus requiring minimal incidence. The system, therefore, has determined that since the projection is for a short period of time, the projection of the recipe should be placed in a location that is very convenient for both individuals 202. The location of the projection of the recipe 204 is placed on the corner of the countertop in close proximity to both individuals 202. In this instance, the system temporarily compromises the optimal ergonomic positioning for convenience. If, for instance, the recipe were much longer with more ingredients and if the length of time to complete the task was much longer, optimal ergonomic positioning would win over convenience.

Figure 3:
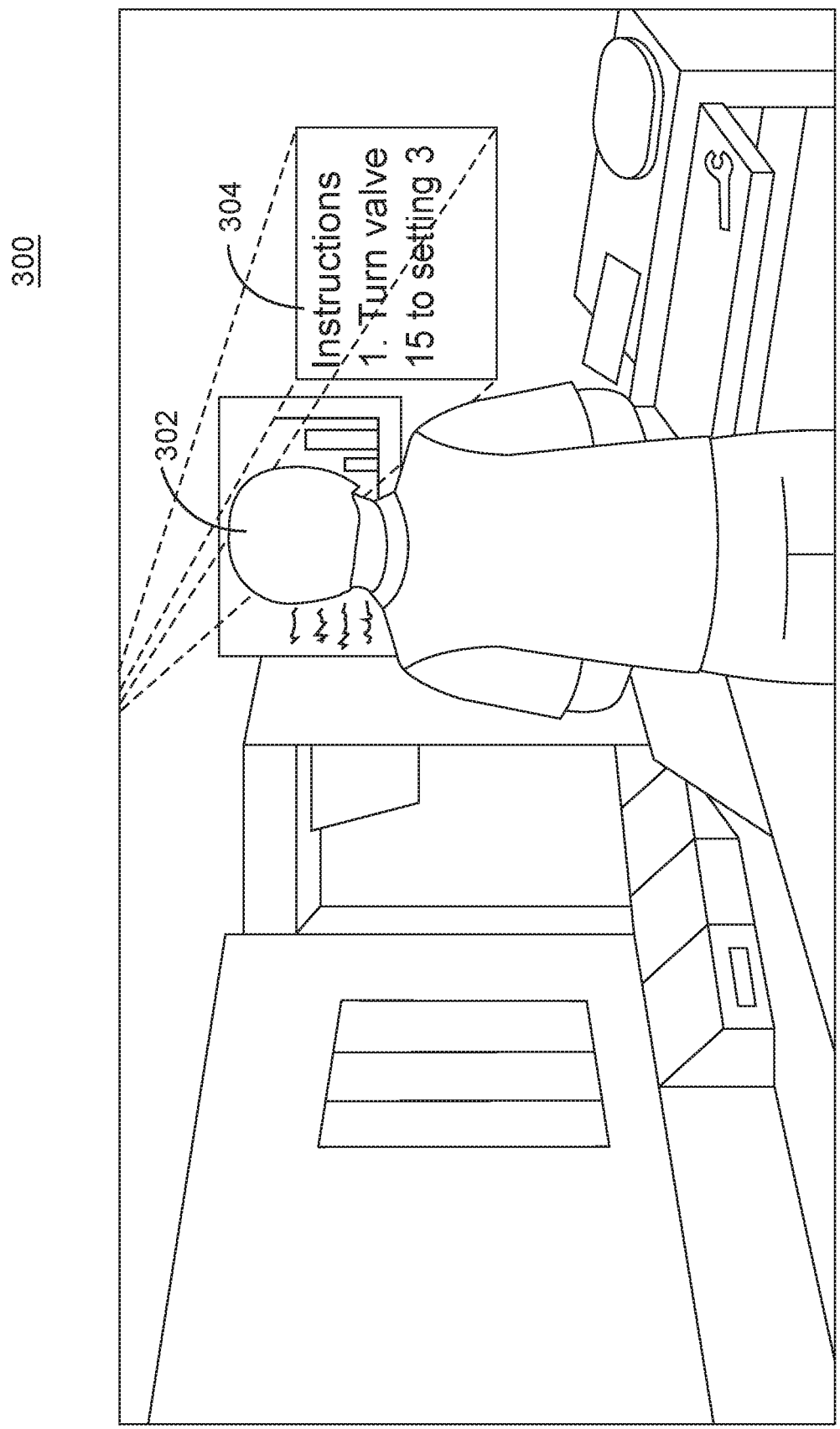
FIG. 3 is another example of a projection from an ambient computing environment in which position of the projection varies by incidence and length of time of display according to an embodiment.

FIG. 3 is another example of a projection from an ambient computing environment in which position of the projection varies by incidence and length of time of display according to an embodiment. Shown in FIG. 3 is a gentleman working in a laboratory with the task of performing experiments. The experiments are extensive. The output is determined to be the instructions for performing the experiments. The gentleman has to constantly view the instructions to see what the next steps are in the experiments. He also must view an output display that is located approximately at a height equivalent to the gentleman's height, and therefore, he must be in a standing position. The system has determined that the projection will last for a long period of time with repeated incidence of viewing the instructions. The system, therefore, places the projected instructions 304 in an optimally ergonomic position comparable to the height of the worker.

Figure 4:
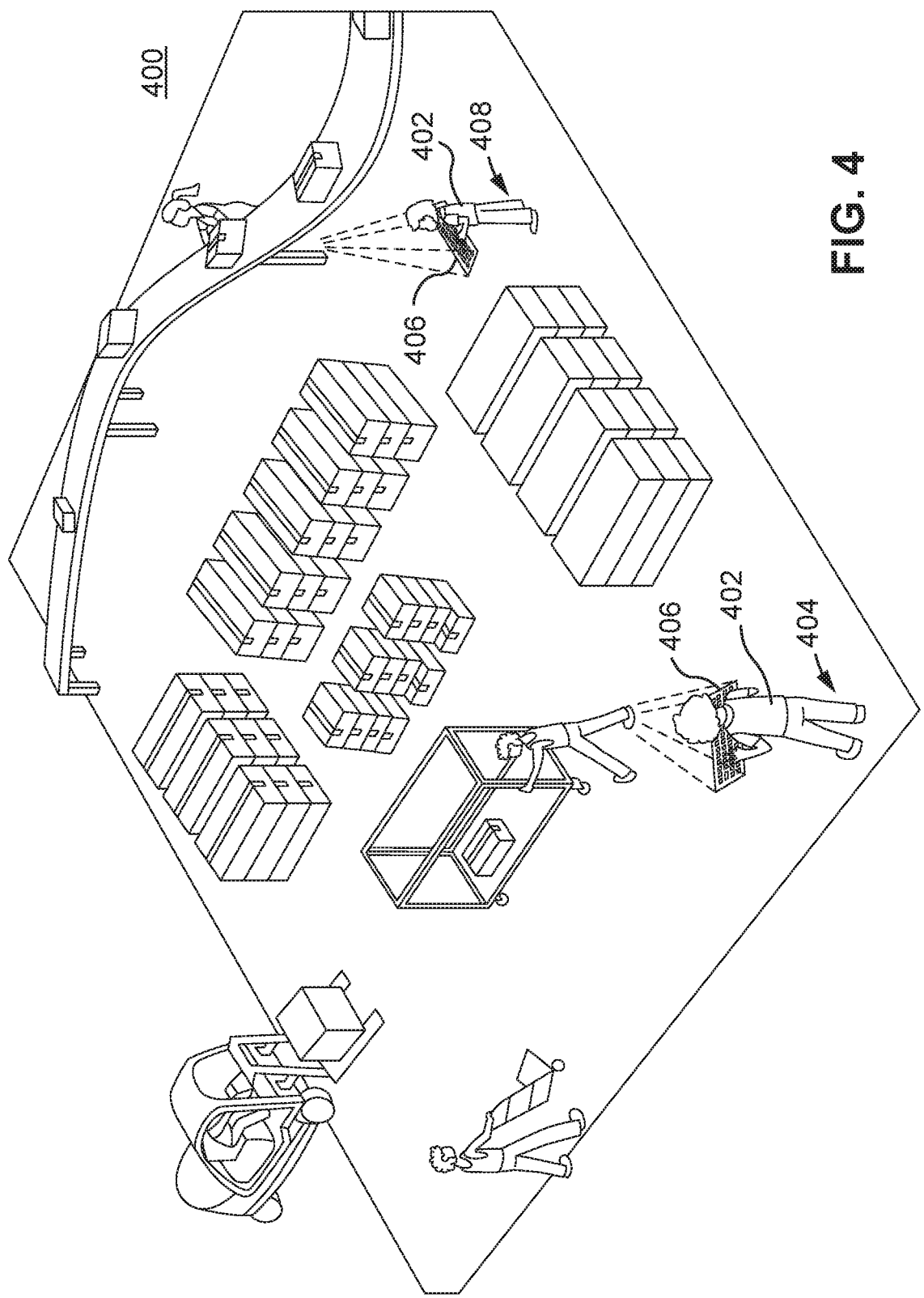
FIG. 4 is an example of a projection from an ambient computing environment in which position of the projection may change as the position of the individual changes according to an embodiment.

FIG. 4 is an example of a projection from an ambient computing environment in which position of the projection may change as the position of the individual changes according to an embodiment. FIG. 4 illustrates operations at a warehouse 400 in which a foreman 402 observing the operations taking place on the warehouse floor may need to provide input to the system from various stations. The foreman 402 may use voice commands to alert the system when it needs to provide input and, in turn, the system will project an input at a location near the foreman 402 to allow the foreman to key in notes. At a first position 404, the foreman 402 commands the system to provide a projected input to allow her to key in notes. The system projects an input keyboard 406 to allow the foreman 402 to key in her notes. Upon completion, the projected input keyboard is removed. Later, at a second position 408 near the assembly line operation, the foreman 402 again commands the system to provide a projected input to allow her to key in additional notes with respect to the assembly line operations. The system projects the input keyboard 406 again to allow the foreman 402 to key in her notes. Upon completion, the projected input keyboard is removed.

Returning to FIG. 1, the posture modeler 116 includes information about healthy postures and the length of time allowed for various postures. The posture modeler 116 uses user profile information and task modelling information to predict postures for the users to perform an interaction in the smart space. The posture modeler 116 also estimates user gaze direction. The posture modeler 116 may also act upon various cues indicating that a user may feel fatigued. For example, the posture modeler 116 may take voice commands, visual cues, such as, for example, neck rubbing or less conscious verbal utterances that may indicate fatigue. If, for example, the interaction is to view a display or key in requested information, the posture modeler 116 will send the predicted postures of the users, the user gaze direction, and any other information that may indicate a state of fatigue or other emotion of one or more users to the task modeler 112 to enable the task modeler 114 to choose optimal locations for an input (such as a touch surface or keyboard) or an output (such as an image or a display).

The hazard evaluation module 120 determines whether the placement of system input(s) and output(s) (i.e., user interfaces) may cause the user to have contact with dangerous surfaces, fire, sharp tools, etc. For example, if for one of the alternatives the display of the recipe in FIG. 2 was placed near a stove, the hazard evaluation module 120 would consider that a possible dangerous surface and would score this as a zero (0) for hazard, indicating a bad score. The hazard evaluation module 120 analyzes all the potential interactive alternatives for safety issues and sends the scores to the trade-off module 122.

The trade-off module 122 receives inputs from the context engine 112, the posture modeler 116, the task modeler 114, and the hazard evaluation module 120, and evaluates each potential interaction alternative. The trade-off module 122 uses a formula or set of heuristics for choosing from the list of potential interaction alternatives. Each alternative may be weighted or scored for desired use. In one embodiment, each interaction may be scored with normalized scores for: incidence+length of time+posture health+convenience*hazard. The interactions with the highest scores may be used for a given task. In this example, a '0' for hazard, indicating a bad score, would create a 'times 0' score for that interaction, thus removing it from the consideration list.

Note that some of the above-mentioned functions may be executed in different modules. For example, instead of the task modeler determining convenience of projected displays, the trade-off module may include that as part of the trade-off formula.

The application 124 provides the system with information relating to the task to be performed. For example, if the task is cooking (see FIG. 2), the content from the application 124 may be a recipe. In another example, if the task is running experiments (see FIG. 3), the content from the application 124 may be instructions for running the experiments. In yet another example, if the task is taking notes to enhance warehouse operations (see FIG. 4), the content from the application 124 may be a spreadsheet for entering notes about the conditions at each station of the warehouse.

Embodiments of the system track users in a smart space to ensure that ambient computing inputs and outputs are projected into locations that provide a ubiquitous computing environment that is comfortable and prevents bad posture and repetitive trauma (injuries that occur over time due to repeated actions). The system takes into account ergonomic and comfort factors such as, but not limited to, length of time of interactions, incidence/rate of interactions, history of previous injuries, locations of users, viewing distance and direction of attended activity and relevant objects, body posture, neck position, occlusions from users point of view, messy hands, potential for repetitive trauma injuries, height differences among co-viewers of a display, comfort and safety measures when interacting/touching surfaces of various temperatures, health conditions of individuals, such as, for example, physical challenges of the user whether temporary or permanent, obstruction of display or touch surfaces by people or objects, etc. Ambient computing input(s) and output(s) may include projected images or other displays, wearable displays that may include augmented reality, such as, for example, a head mounted display with augmented reality, dynamic touch surfaces, for example, touch gestures captured by one or more cameras, audio outputs, which may include localized 3D audio, haptic output on surfaces, chemical output for odor generation, interaction of environment with wearable devices on the body for input and output, and other types of input(s) and output(s) that may be projected.

Figure 5A:
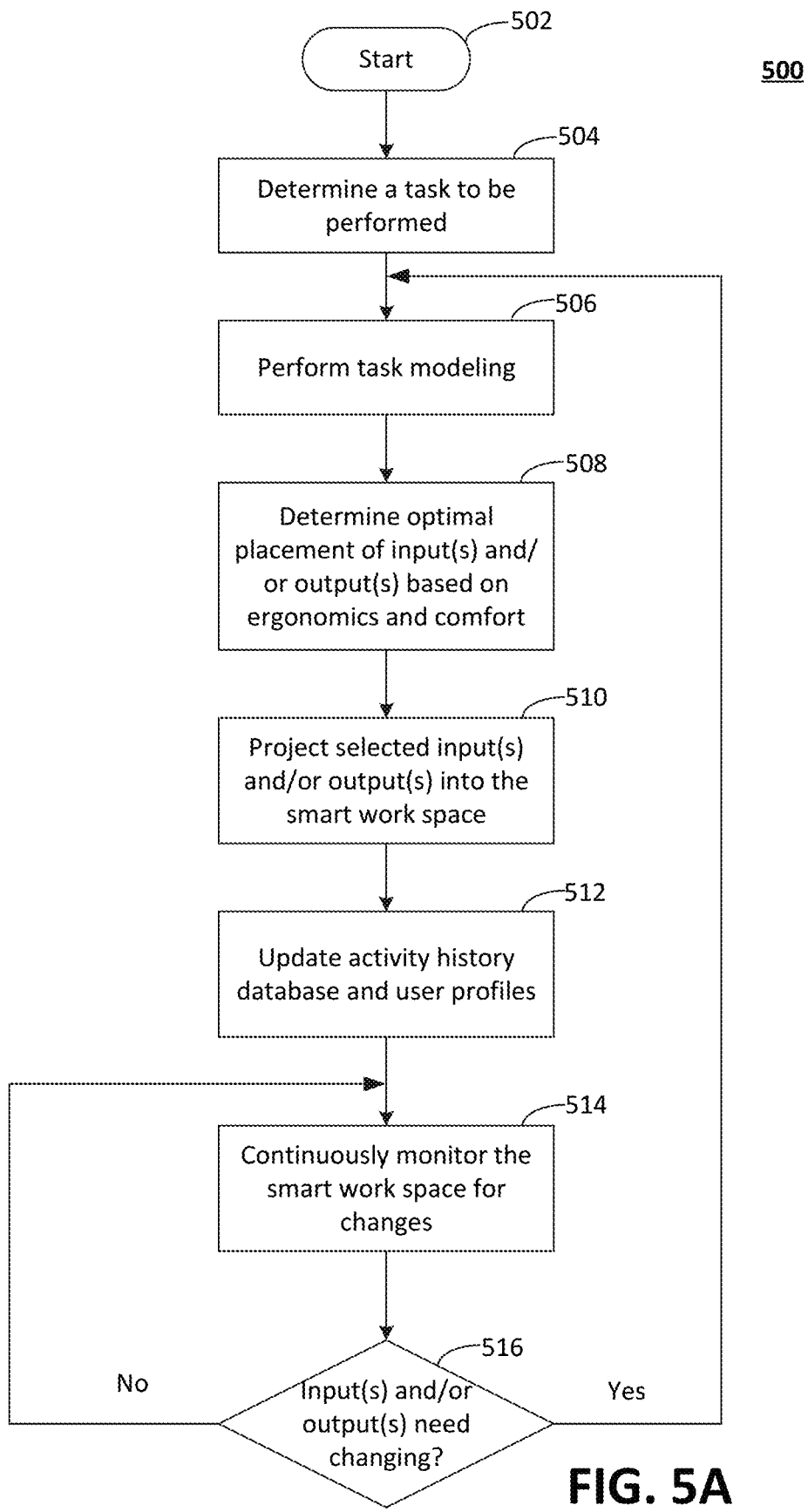
FIG. 5A is a flow diagram of an example of a method of monitoring and adjusting a user's smart work space to provide healthy ergonomic interactions according to an embodiment.

FIG. 5A is a flow diagram of an exemplary method 500 for monitoring and adjusting a smart work space for providing healthy ergonomic interactions according to an embodiment. The method 500 may generally be implemented in a computing system such as, for example, the ergonomic control system 104 as shown in FIG. 1. More particularly, the method 500 may be implemented in one or more module as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), and fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 500 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instruction, instruction set architecture (ISA) instructions, machine instruction, machine depended instruction, microcode, state setting data, configuration data for integrated circuitry, state information that personalizes electronic circuitry and/or other structural component that are native to hardware (e.g., host processor, central processing unit (CPU), microcontroller, etc.)

The method 500 for monitoring and adjusting a smart work space for providing healthy ergonomic interactions begin in block 502 where the process immediately proceeds to block 504. In block 504, the ergonomic control system determines a task to be performed in a smart work space. This process is described below with reference to FIG. 5B. The process then proceeds to block 506.

In block 506, task modeling is performed. This includes determining projected input and output needed to perform the task. Task modeling is described in further detail with reference to FIG. 5C. The process proceeds to block 508.

In block 508, optimal placement of inputs and outputs based on ergonomics and comfort are determined. Placement of projected inputs and outputs depends on such factors as incidence, length of time of interaction, posture health, convenience, and safety. This process is described below with reference to FIG. 5D. The process proceeds to block 510.

In block 510, the selected input and output are projected into the smart workspace. The process then proceeds to block 512.

In block 512, the activity history database is updated. The updates include such information as, for example, the interaction, how long the interaction took, and how long a user held a specific posture while doing the interaction. In block 512, user profiles are also updated. At this time, any information gleaned from the interaction that is helpful to know about the user for future interactions is recorded in the user profile. The process then proceeds to block 514.

In block 514, the smart workspace is continuously monitored for changes that may affect the placement of the inputs and outputs. For example, a note placed on a counter may now need to be placed on a wall due to the movement of the user. The process proceeds to decision block 516.

In decision block 516, it is determined whether inputs or outputs need to be changed. This includes not only changing the type of input and output, but also changing the position of one or more inputs and outputs. If it is determined that changes need to be made, the process proceeds back to block 506 to perform task modeling.

Returning to decision block 516, if it is determined that no changes need to be made at this time, the process proceeds back to block 514, where the ergonomic control system 104 continuously monitor the smart workspace for changes.

Figure 5B:
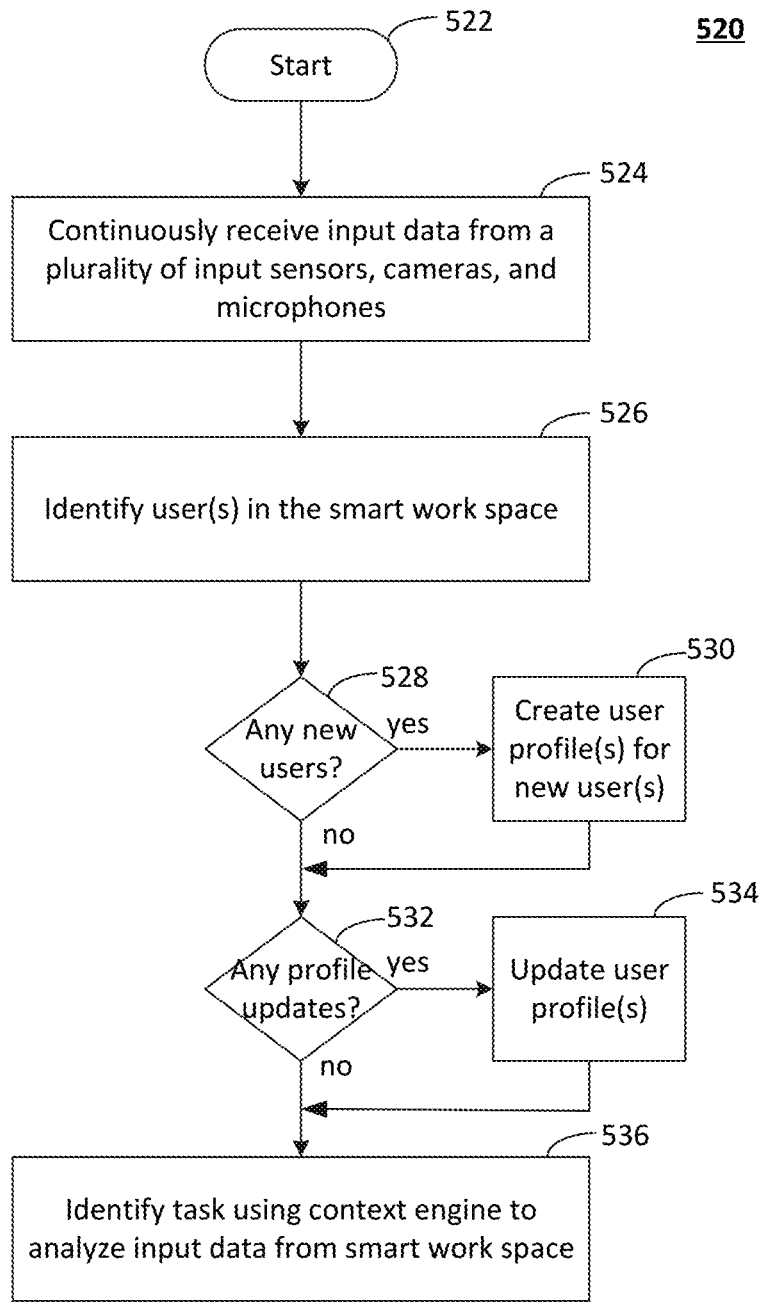
FIG. 5B is a flow diagram of an example of a method of determining a task to be performed in a smart work space according to an embodiment.

FIG. 5B is a flow diagram of an exemplary method 520 for determining a task to be performed in a smart work space according to an embodiment. The method 520 may generally be implemented in a computing system such as, for example, the ergonomic control system 104 as shown in FIG. 1. More particularly, the method 520 may be implemented in one or more module as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

The method 524 determining a task to be performed in a smart workspace begins in block 522, and immediately proceeds to block 524. In block 524, the ergonomic control system 104 continuously receives input data from a plurality of input sensors, cameras, and microphones (102a-n). The plurality of input sensors, cameras, and microphones (102a-n) are strategically placed throughout the smart work space. Using technologies such as, for example, face recognition, speech/speaker recognition, and context aware, the context engine 112 may discern context information about the smart workspace from the input sensors, cameras, and microphones (102a-n). The process proceeds to block 526.

In block 526, the users in the smart workspace are identified. Users may be identified through face recognition techniques using video input from one or more cameras. Users may also be identified through speaker recognition techniques using voice input from one or more microphones. Face recognition and speaker recognition techniques are well known to those skilled in the relevant art(s). The process proceeds to decision block 528.

In decision block 528, it is determined if there are any new users of the smart workspace. If there are new users of the smart workspace, the process proceeds to block 530.

In block 530, user profiles for the new users are created. The process then proceeds to decision block 532.

Returning to decision block 528, if there are no new users, the process proceeds to decision block 532.

In decision block 532, it is determined if there are any user profile updates. If there are any user profile updates, the process proceeds to block 534. In block 534, user profiles are updated. The process then proceeds to block 536.

Returning to decision block 532, if there are no user profile updates to be made, the process proceeds to block 536.

In block 536, the task to be performed is identified using context engine 112. Context engine 112 uses well known context aware techniques to analyze the input data collected from the input sensors, cameras, and microphones (102a-n) in the smart workspace. User locations may also be determined using the context engine as well as the input cameras and microphones.

Figure 5C:
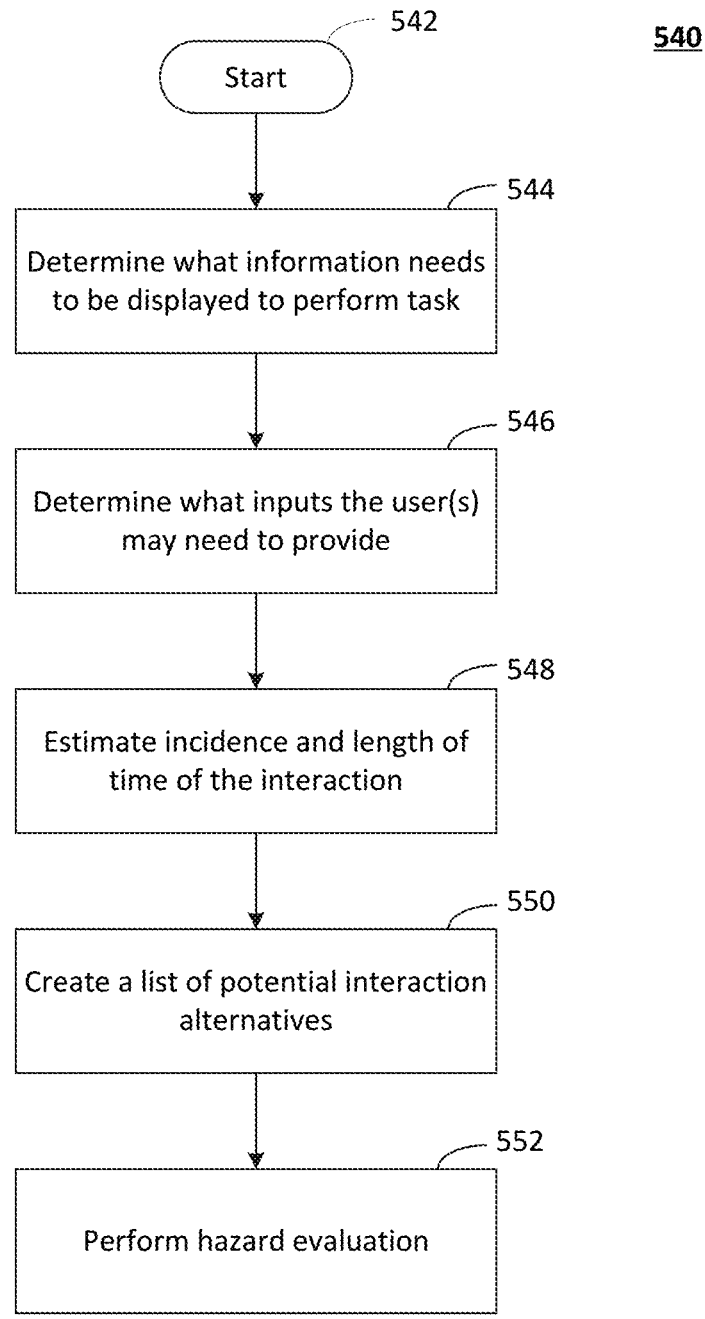
FIG. 5C is a flow diagram of an example of a method of performing task modeling according to an embodiment.

FIG. 5C is a flow diagram of an exemplary method 540 for performing task modeling according to an embodiment. The method 540 may generally be implemented in a computing system such as, for example, the ergonomic control system 104 as shown in FIG. 1. More particularly, the method 540 may be implemented in one or more module as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

The method 540 for performing task modeling begins in block 542, and immediately proceeds to block 544. In block 544, the task modeler 114 determines what information needs to be displayed in order to perform the identified task. The task modeler 114 uses information that it receives from the application 124 as well as activity history from the activity history database 118 to determine what information may need to be displayed to perform the task. For example, if the task modeler 114 receives content indicating a recipe to make lasagna, the task modeler can review the activity history database 118 to find previous cooking tasks to see what was displayed. The process then proceeds to block 546.

In block 546, the task modeler 114 determines what inputs the user may need to provide the ergonomic control system 104. Again, the task modeler 114 may use information that it receives from the application 124 as well as activity history from the activity history database 118 to determine what inputs the user may need to provide the system. The task modeler 114 may look through the activity history database 118 to find previous tasks of a similar kind to determine what inputs a user might need. The process then proceeds to block 548.

In block 548, the task modeler 114 may estimate incidence/rate of interactions and length of time of interactions. The task modeler 114 may utilize the activity history database 118 and the input from the application 124 to provide this estimate. The process then proceeds to block 550.

In block 550, the task modeler 114 also creates a list of potential interaction alternatives for inputs and outputs (i.e., user interfaces). Convenience of the inputs and outputs, especially proximity to the user's, is strongly considered by the task modeler 114. In instances where the rate of interactions and the length of time of interactions is low, the task modeler 114 may lean toward providing projected inputs and outputs that are placed in convenient locations that temporarily compromise optimal ergonomic position. On the other hand, instances in which the rate of interactions and the length of time of interactions is long will cause the task modeler 114 to lean more toward providing ergonomically sound positions within the smart workspace. The process then proceeds to block 552.

In block 552, hazard evaluations are performed for each item on the list of potential interaction alternatives using the hazard evaluation module 120. The hazard evaluation module 120 determines whether projected inputs and outputs may cause a user to have contact with dangerous surfaces, fire, sharp tools, and other dangerous items. If an item on the list of potential interaction alternatives is found to be hazardous, the item is removed from the list.

Figure 5D:
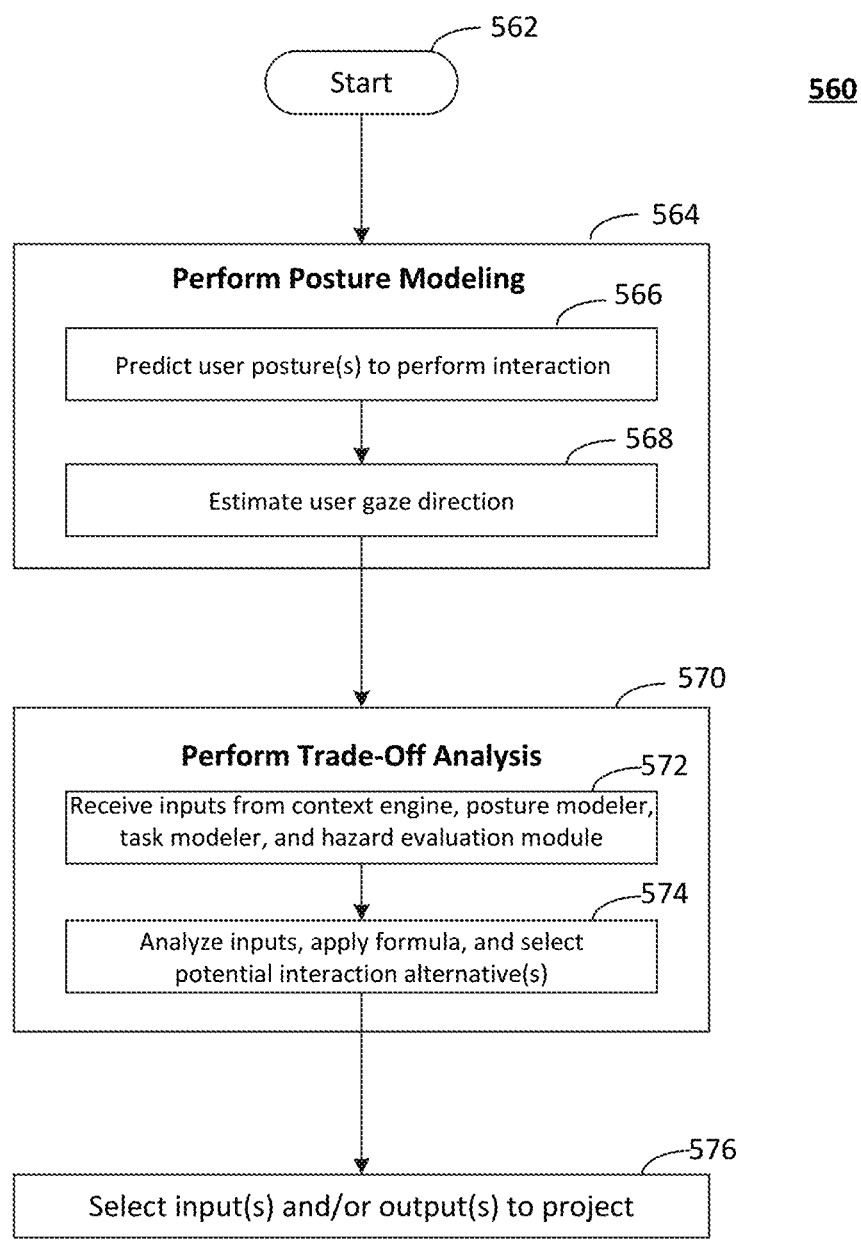
FIG. 5D is a flow diagram of an example of a method of determining optimal placement of inputs and outputs based on ergonomics and comfort according to an embodiment.

FIG. 5D is a flow diagram of an exemplary method 560 for determining optimal placement of inputs and outputs based on ergonomics and comfort according to an embodiment. The method 560 may generally be implemented in a computing system such as, for example, the ergonomic control system 104 as shown in FIG. 1. More particularly, the method 560 may be implemented in one or more module as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

The method 564 determining optimal placement of inputs and outputs based on ergonomics and comfort begins in block 562, where it immediately proceeds to block 564. In block 564, a posture modeler 116 uses user profile information and task modeling information to predict user postures to perform an interaction with the system. An interaction may be, for example, viewing a projected display or keying in information using a projected input device. The posture modeler 116 includes information about healthy postures and length of time allowed for various postures. The posture modeler 116 uses this information along with body dimensions for each user (obtained from the user's user profile) and the information from the task modeler 114 (estimated rate of interaction/incidence and length of time of interaction) to predict user postures to perform an interaction in block 566. The posture modeler 116 also estimates user gaze direction to enable the task modeler 114 to choose projected display locations in block 568. The posture modeler 116 may also take voice commands, visual cues like neck rubbing, or less conscious verbal utterances that may indicate fatigue. The process then proceeds to block 570.

In block 570, trade off analysis is performed using trade off module 122. The trade off module 122 receives input from the context engine 112, task modeler 114, posture modeler 116, and hazard evaluation module 120 in block 572. The context engine 112 provides information such as the location of the users with in the smart workspace, the task, whether a user's hands are messy or clean (this information is useful to determine whether the user can input information through a touch surfaces), and proximity to resources such as, for example, screens and keyboards. The task modeler 114 provides a list of potential interaction alternatives for inputs and outputs. The posture modeler 116 may provide the user posture predictions as well as the estimated user gaze direction for the users in the smart workspace. The hazard evaluation module may provide a "0" or a "1" to indicate whether a given potential interaction alternatives is hazardous. If the indication is a "0", the potential interaction alternative is hazardous. If the indication is a "1", the potential interaction alternative is not hazardous. In block 574, the trade off module 122 applies a formula or set of heuristics for choosing from the list of potential interaction alternatives. Each alternative may be weighted or scored for desired use. In one embodiment, each interaction may be scored with normalized scores for: incidence+length of time of interaction+posture health+convenience*hazard. If the hazard is indicated as a "0", the resulting score will be zero four that interaction, thus removing it from the consideration list. The interactions with the highest may be used for a given task. The process then proceeds to block 576.

In block 576, the projected input(s) and/or output(s) are selected.

Note that there may be instances in which a projected input or output is not needed due to the smart workspace already having an input or output device available for use during the task. In this instance, an LED on or near the device may be used as an indicator to alert the user to view the device or key in data using the device.

Figure 5E:
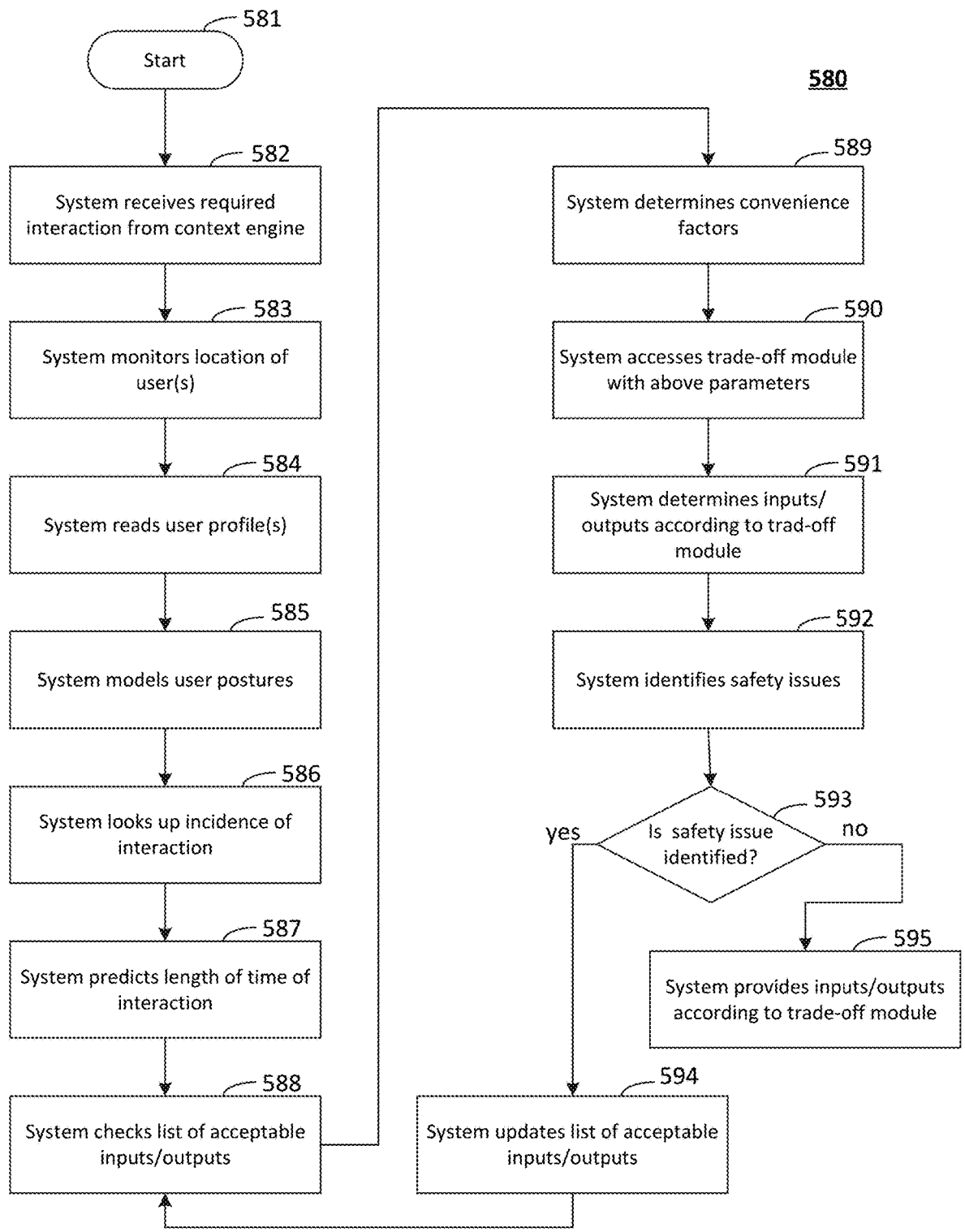
FIG. 5E is another flow diagram of an example of a method of monitoring and adjusting a smart work space for providing healthy ergonomic interactions according to an embodiment.

FIG. 5E is a flow diagram of an exemplary method 580 for monitoring and adjusting a smart work space for providing healthy ergonomic interactions according to an embodiment. The method 580 may generally be implemented in a computing system such as, for example, the ergonomic control system 104 as shown in FIG. 1. More particularly, the method 580 may be implemented in one or more module as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

The method 580 starts at a point where the system has identified an interaction and now needs to determine the inputs/outputs to use. The process begins in block 581, where the process immediately proceeds to block 582.

In block 582, the system receives the required interaction. The process then proceeds to block 583.

In block 583, the system monitors the location of the users in the smart workspace. In some embodiments, the context engine 112, may determine user locations based on the information received from the input devices 102a-n. The process then proceeds to block 584.

In block 584, the user profiles of the users in the smart workspace are retrieved from the user profile database. The process then proceeds to block 585.

In block 858, the user profiles are used by the posture modeler 116 to model user postures for the interaction. The process then proceeds to block 586.

In block 586, the task modeler 114 estimates the incidence of interaction. In an embodiment, the task modeler 114 may search the activity history database 118 to find interactions of a similar nature to see what the incidence of interaction was and make an estimate of the incidence of interaction based on previous similar interactions. The process then proceeds to block 587.

In block 587, the task modeler 114 estimates the length of time of interaction in a manner similar to estimating the incidence of interaction as described above. The process then proceeds to block 588.

In block 588, a list of acceptable inputs/outputs are reviewed. The process then proceeds to block 589.

In block 589, convenience factors are determined for the list of acceptable inputs and outputs. For example, if the incidence is low and the length of interaction is short, then a more convenient location for projection of an input or output may be chosen. If, for example, the incidence is high and the length of interaction is long, then a location that provides good ergonomics, such as posture, neck position, etc., may be chosen. The process proceeds to block 590.

In block 590, information such as incidence, length of time of interaction, posture health, and convenience are provided as inputs to the trade-off module 122. The trade-off module analyzes each of the acceptable inputs/outputs on the list using the formula given above, or another formula that takes into consideration all of the factors previously discussed, such as, for example, incidence, length of time of interaction, posture health, and convenience. The trade-off module 122 scores each acceptable input/output on the list and selects the inputs/outputs with the highest scores. The process then proceeds to block 592.

In block 592, the hazard evaluation module determines whether the selected inputs and outputs from the trade-off module 122 may cause a user to have contact with dangerous surfaces, fire, sharp tools, or other hazards. If any of the selected inputs and outputs would be a danger to a user, the system has identified a safety issue. The process then proceeds to decision block 593.

In decision block 593, it is determined if a safety issue has been identified. If a safety issue has been identified, then the process proceeds to block 594.

In block 594, the list of acceptable inputs/outputs is updated by removing the entry that has resulted in a safety issue. In some embodiments, the system may look for an alternative as a replacement to add to the list.

Returning to block 593, if a safety issue has not been identified, then the process proceeds to block 595. In block 595, the system provides the inputs/outputs as identified by the trade-off module 122.

Figure 6:
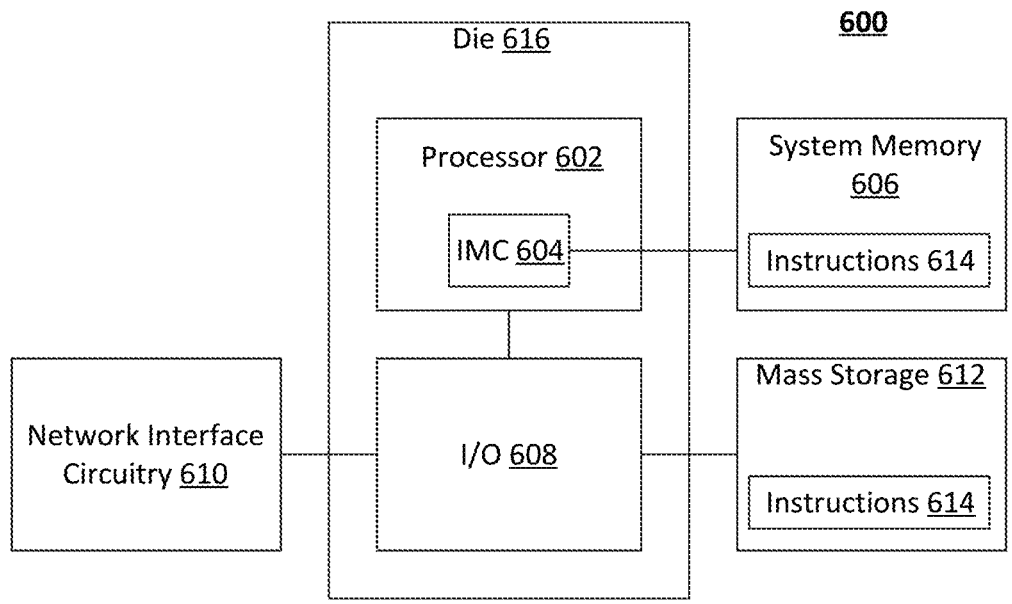
FIG. 6 is a block diagram of an example of an ergonomic control system according to an embodiment.

FIG. 6 shows a system 600 that may be readily substituted for the ergonomic control system 104 (FIG. 1), already discussed. The illustrated system 600 includes a processor 602 (e.g., host processor, central processing unit/CPU) having an integrated memory controller (IMC) 604 coupled to a system memory 606 (e.g., volatile memory, dynamic random access memory/DRAM). The processor 602 may also be coupled to an input/output (110) module 608 that communicates with network interface circuitry 610 (e.g., network controller, network interface card/NIC) and mass storage 612 (non-volatile memory/NVM, hard disk drive/HDD, optical disk, solid state disk/SSD, flash memory).

The network interface circuitry 610 may receive sensor input data from a plurality of input devices such as, for example, the input devices 102a-n (shown in FIG. 1), wherein the system memory 606 and/or the mass storage 612 may be memory devices that store instructions 614, which when executed by the processor 602, cause the system 600 to perform one or more aspects of the method 500 (FIG. 5A), the method 520 (FIG. 5B), the method 540 (FIG. 5C), and/or the method 560 (FIG. 5D), already discussed. Thus, execution of the instructions 614 may cause the system 600 to determine a task to be performed in a smart work space and perform task modeling, including determining inputs and outputs needed to perform the task and optimal placement of the inputs and outputs based on incidence and length of time of interaction with the inputs and outputs, and send, via the network interface circuitry 114, the placement information for inputs and outputs into the smart work space that provide healthy ergonomic interactions for the users. The processor 602 and the IO module 608 may be incorporated into a shared die 616 as a system on chip (SoC).

Figure 7:
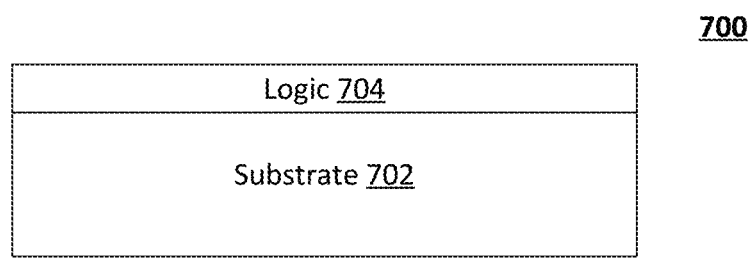
FIG. 7 is an illustration of an example of a semiconductor package apparatus according to an embodiment.

FIG. 7 shows a semiconductor package apparatus 700 (e.g., chip) that includes a substrate 702 (e.g., silicon, sapphire, gallium arsenide) and logic 704 (e.g., transistor array and other integrated circuit/IC components) coupled to the substrate 702. The logic 704, which may be implemented in configurable logic and/or fixed-functionality logic hardware, may generally implement one or more aspects of the method 500 (FIG. 5A), the method 520 (FIG. 5B), the method 540 (FIG. 5C), and/or the method 560 (FIG. 5D), already discussed.

Figure 8:
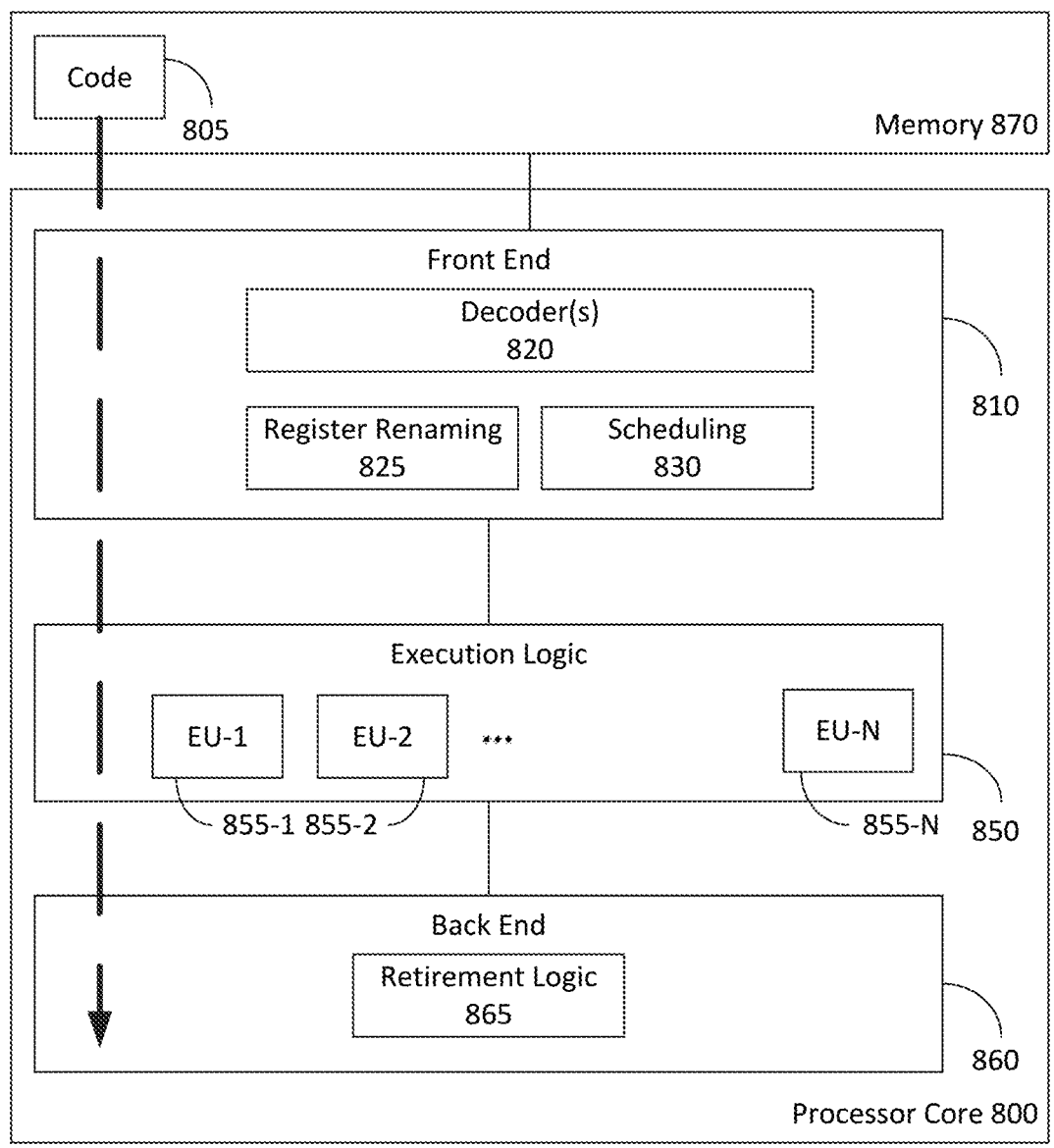
FIG. 8 is a block diagram of an exemplary processor according to an embodiment.

FIG. 8 illustrates a processor core 800 according to one embodiment. The processor core 800 may be the core for any type of processor, such as a micro-processor, an embedded processor, a digital signal processor (DSP), a network processor, or other device to execute code. Although only one processor core 800 is illustrated in FIG. 8, a processing element may alternatively include more than one of the processor core 800 illustrated in FIG. 8. The processor core 800 may be a single-threaded core or, for at least one embodiment, the processor core 800 may be multithreaded in that it may include more than one hardware thread context (or "logical processor") per core.

FIG. 8 also illustrates a memory 870 coupled to the processor core 800. The memory 870 may be any of a wide variety of memories (including various layers of memory hierarchy) as are known or otherwise available to those of skill in the art. The memory 870 may include one or more code 805 instruction(s) to be executed by the processor core 800, wherein the code 805 may implement the method 500

(FIG. 5A), the method 520 (FIG. 5B), the method 540 (FIG. 5C), and/or the method 560 (FIG. 5D), already discussed. The processor core 800 follows a program sequence of instructions indicated by the code 805. Each instruction may enter a front end portion 810 and be processed by one or more decoders 820. The decoder 820 may generate as its output a micro operation such as a fixed width micro operation in a predefined format, or may generate other instructions, microinstructions, or control signals which reflect the original code instruction. The illustrated front end portion 810 also includes register renaming logic 825 and scheduling logic 830, which generally allocate resources and queue the operation corresponding to the convert instruction for execution.

The processor core 800 is shown including execution logic 850 having a set of execution units 855-1 through 855-N. Some embodiments may include a number of execution units dedicated to specific functions or sets of functions. Other embodiments may include only one execution unit or one execution unit that can perform a particular function. The illustrated execution logic 850 performs the operations specified by code instructions.

After completion of execution of the operations specified by the code instructions, back end logic 860 retires the instructions of the code 805. In one embodiment, the processor core 800 allows out of order execution but requires in order retirement of instructions. Retirement logic 865 may take a variety of forms as known to those of skill in the art (e.g., re-order buffers or the like). In this manner, the processor core 800 is transformed during execution of the code 805, at least in terms of the output generated by the decoder, the hardware registers and tables utilized by the register renaming logic 825, and any registers (not shown) modified by the execution logic 850.

Although not illustrated in FIG. 8, a processing element may include other elements on chip with the processor core 800. For example, a processing element may include memory control logic along with the processor core 800. The processing element may include I/O control logic and/or may include I/O control logic integrated with memory control logic. The processing element may also include one or more caches.

Referring now to FIG. 9, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 500 (FIG. 5A), the method 520 (FIG. 5B), the method 540 (FIG. 5C), and/or the method 560 (FIG. 5D), already discussed, and may be similar to the code 805 (FIG. 8), already discussed. Further, an audio I/O 1024 may be coupled to second bus 1020 and a battery 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Additional Notes and Examples

Example 1 may include an ergonomic control system comprising network interface circuitry to receive sensor input data from a plurality of input sensor devices, a processor coupled to the network interface circuitry, one or more memory devices coupled to the processor, the one or more memory devices including instructions, which when executed by the processor, cause the system to determine a task to be performed in a smart work space, perform task modeling, wherein task modeling includes determining one or more user interfaces involved with the task, determine one or more placements for the one or more user interfaces based on one or more ergonomic conditions, an incidence of an interaction, and a length of time of the interaction, and position the one or more user interfaces into the smart work space in accordance with the determined one or more placements.

Example 2 may include the ergonomic control system of Example 1, wherein the instructions, when executed, cause the computing system to predict user postures to perform the interaction using user profile information and task modeling information, wherein if a user does not have a user profile, the instructions, when executed, further cause the computing system to create a user profile for the user.

Example 3 may include the ergonomic control system of Example 1, wherein the instructions to cause the computing system to perform task modeling further includes instructions to cause the computing system to determine what information is to be displayed to perform the task, determine what inputs the user is to provide to the system to perform the task, estimate the incidence of the interaction and the length of time of the interaction, and create a list of potential interaction alternatives based on convenience of the one or more user interfaces.

Example 4 may include the ergonomic control system of Example 3, wherein the instructions, when executed, cause the computing system to evaluate each of the potential interaction alternatives on the list to determine whether any safety hazards are involved, wherein if a potential interaction alternative includes at least one safety hazard, the instructions, when executed, further cause the computing system to remove the potential interaction alternative from the list.

Example 5 may include the ergonomic control system of Example 4, wherein each of the potential interaction alternatives on the list is weighted and scored as a function of the incidence of the interaction, the length of time of the interaction, a posture health parameter, a user convenience parameter, and a hazard parameter, wherein the potential interaction alternatives with highest scores are used as the one or more user interfaces.

Example 6 may include the ergonomic control system of Example 3, wherein the instructions to cause the computing system to estimate the incidence and length of time of the interaction include further instructions, that when executed, cause the computing system to review entries of similar tasks in an activity history database, the activity history database includes information on how long previous interactions took and how long a user held a specific posture while performing the interaction and if any injuries occurred based on the specific posture.

Example 7 may include the ergonomic control system of Example 1, wherein user interface inputs include one or more of projected input devices, dynamic touch surfaces, keyboards, and wearable device environmental inputs.

Example 8 may include the ergonomic control system of Example 1, wherein user interface outputs include one or more of projected images, projected displays, physical displays, drones, robots, augmented reality wearable displays, speakers, audio outputs, haptic surfaces, odor generation outputs, and wearable device environmental outputs.

Example 9 may include the ergonomic control system of any one of Examples 1 to 8, wherein if the incidences are relatively minimal, the length of time of the interaction is relatively short and placement of the one or more user interfaces is for a relatively short period of time, further instructions, when executed, cause the computing system to position the one or more user interfaces in a location having a relatively high convenience to a user performing the task.

Example 10 may include the ergonomic control system of any one of Examples 1 to 8, wherein if there are multiple incidences, the length of time of interaction is relatively long and placement of the one or more user interfaces is for a relatively long period of time, further instructions, when executed, cause the computing system to position the one or more user interfaces in a location that provides a relatively high ergonomic result to a user performing the task.

Example 11 may include an ergonomic work space apparatus comprising a substrate, and logic coupled to the substrate, wherein the logic includes one or more of configurable logic or fixed-functionality hardware logic, the logic coupled to the substrate to determine a task to be performed in a smart work space, perform task modeling, wherein task modeling includes determining one or more user interfaces involved with the task, determine one or more placements for the one or more user interfaces based on one or more ergonomic conditions, an incidence of an interaction, and a length of time of the interaction, and position the one or more user interfaces into the smart work space in accordance with the determined one or more placements.

Example 12 may include the apparatus of Example 11, wherein the logic coupled to the substrate is to perform posture modeling, wherein posture modeling includes predicting user postures to perform the interaction using user profile information and task modeling information, wherein if a user does not have a user profile, the logic coupled to the substrate is to create a user profile for the user.

Example 13 may include the apparatus of Example 11, wherein the logic coupled to the substrate to perform task modeling further includes logic coupled to the substrate to determine what information is to be displayed to perform the task, determine what inputs the user is to provide to the system to perform the task, estimate the incidence of the interaction and the length of time of the interacion, and create a list of potential interaction alternatives based on convenience of the one or more user interfaces.

Example 14 may include the apparatus of Example 13, wherein the logic coupled to the substrate is to evaluate each potential interaction alternative on the list to determine whether any safety hazards are involved, wherein if a potential interaction alternative includes at least one safety hazard, the logic coupled to the substrate is to remove the potential interaction alternative from the list.

Example 15 may include the apparatus of Example 14, wherein each potential interaction alternative on the list is weighted and scored as a function of the incidence of the interaction, the length of time of the interaction, a posture health parameter, a user convenience parameter, and a hazard parameter, wherein the potential interaction alternatives with highest scores are used as the one or more user interfaces.

Example 16 may include the apparatus of Example 13, wherein the logic coupled to the substrate to estimate the incidence and length of time of the interaction includes logic coupled to the substrate to review entries of similar tasks in an activity history database, the activity history database includes information on how long previous interactions took and how long a user held a specific posture while performing the interaction and if any injuries occurred based on the specific posture.

Example 17 may include the apparatus of Example 11, wherein user interface inputs include one or more of projected input devices, dynamic touch surfaces, keyboards, and wearable device environmental inputs.

Example 18 may include the apparatus of Example 11, wherein user interface outputs include one or more of projected images, projected displays, physical displays, drones, robots, augmented reality wearable displays, speakers, audio outputs, haptic surfaces, odor generation outputs, and wearable device environmental outputs.

Example 19 may include the apparatus of any one of Examples 11 to 18, wherein if the incidences are relatively minimal, the length of time of the interaction is relatively short and placement of the one or more user interfaces is for a relatively short period of time, the logic coupled to the substrate to position the one or more user interfaces in a location having a relatively high convenience to a user performing the task.

Example 20 may include the apparatus of any one of Examples 11 to 18, wherein if there are multiple incidences, the length of time of interaction is relatively long and placement of the one or more user interfaces is for a relatively long period of time, the logic coupled to the substrate to position the one or more user interfaces in a location that provides a relatively high ergonomic result to a user performing the task.

Example 21 may include a method of providing smart work spaces in ubiquitous computing environments, comprising determining a task to be performed in a smart work space, performing task modeling, wherein task modeling includes determining one or more user interfaces involved with the task, determining one or more placements for the one or more user interfaces based on one or more ergonomic conditions, an incidence of an interaction, and a length of time of the interaction, and positioning the one or more user interfaces into the smart work space in accordance with the determined one or more placements.

Example 22 may include the method of Example 21, further comprising performing posture modeling, wherein posture modeling includes predicting user postures to perform the interaction using user profile information and task modeling information, wherein if a user does not have a user profile, the method further comprising creating a user profile.

Example 23 may include the method of Example 21, wherein task modeling includes determining what information is to be displayed to perform the task, determining what inputs the user is to provide to the system to perform the task, estimating the incidence of the interaction and the length of time of the interaction, and creating a list of potential interaction alternatives based on convenience of the one or more user interfaces.

Example 24 may include the method of Example 23, further comprising evaluating each potential interaction alternative on the list to determine whether any safety hazards are involved, wherein if a potential interaction alternative includes at least one safety hazard, removing the potential interaction alternative from the list.

Example 25 may include the method of Example 24, wherein each potential interaction alternative on the list is weighted and scored as a function of the incidence of the interaction, the length of time of the interaction, a posture health parameter, a user convenience parameter, and a hazard parameter, wherein the potential interaction alternatives with highest scores are used as the one or more user interfaces.

Example 26 may include the method of Example 23, wherein estimating the incidence and length of time of the interaction includes reviewing entries of similar tasks in an activity history database, the activity history database includes information on how long previous interactions took and how long a user held a specific posture while performing the interaction and if any injuries occurred based on the specific posture.

Example 27 may include the method of Example 21, wherein user interface inputs include one or more of projected input devices, dynamic touch surfaces, keyboards, and wearable device environmental inputs.

Example 28 may include the method of Example 21, wherein user interface outputs include one or more of projected images, projected displays, physical displays, drones, robots, augmented reality wearable displays, speakers, audio outputs, haptic surfaces, odor generation outputs, and wearable device environmental outputs.

Example 29 may include the method of any one of Examples 21 to 28, wherein if the incidences are relatively minimal, the length of time of the interaction is relatively short and placement of the one or more user interfaces is for a relatively short period of time, positioning the one or more user interfaces in a location having a relatively high convenience to a user performing the task.

Example 30 may include the method of any one of Examples 21 to 28, wherein if there are multiple incidences, the length of time of interaction is relatively long and placement of the one or more user interfaces is for a relatively long period of time, positioning the one or more user interfaces in a location that provides a relatively high ergonomic result to a user performing the task.

Example 31 may include at least one computer readable storage medium comprising a set of instructions, which when executed by a computing system, cause the computing system to determine a task to be performed in a smart work space, perform task modeling, wherein task modeling includes determining one or more user interfaces involved with the task, determine one or more placements for the one or more user interfaces based on one or more ergonomic conditions, an incidence of an interaction, and a length of time of the interaction, and position the one or more user interfaces into the smart work space in accordance with the determined one or more placements.

Example 32 may include the at least one computer readable storage medium of Example 31, wherein the instructions, when executed, cause the computing system to predict user postures to perform the interaction using user profile information and task modeling information, wherein if a user does not have a user profile, the instructions, when executed, further cause the computing system to create a user profile for the user.

Example 33 may include the at least one computer readable storage medium of Example 31, wherein the instructions to cause the computing system to perform task modeling further includes instructions to cause the computing system to determine what information is to be displayed to perform the task, determine what inputs the user is to provide to the system to perform the task, estimate the incidence of the interaction and the length of time of the interaction, and create a list of potential interaction alternatives based on convenience of the one or more user interfaces.

Example 34 may include the at least one computer readable storage medium of Example 33, wherein the instructions, when executed, cause the computing system to evaluate each potential interaction alternative on the list to determine whether any safety hazards are involved, wherein if a potential interaction alternative includes at least one safety hazard, the instructions, when executed, further cause the computing system to remove the potential interaction alternative from the list.

Example 35 may include the at least one computer readable storage medium of Example 34, wherein each potential interaction alternative on the list is weighted and scored as a function of the incidence of the interaction, the length of time of the interaction, a posture health parameter, a user convenience parameter, and a hazard parameter, wherein the potential interaction alternatives with highest scores are used as the one or more user interfaces.

Example 36 may include the at least one computer readable storage medium of Example 33, wherein the instructions to cause the computing system to estimate the incidence and length of time of the interaction include further instructions, that when executed, cause the computing system to review entries of similar tasks in an activity history database, the activity history database includes information on how long previous interactions took and how long a user held a specific posture while performing the interaction and if any injuries occurred based on the specific posture.

Example 37 may include the at least one computer readable storage medium of Example 31, wherein user interface inputs include one or more of projected input devices, dynamic touch surfaces, keyboards, and wearable device environmental inputs.

Example 38 may include the at least one computer readable storage medium of Example 31, wherein user interface outputs include one or more of projected images, projected displays, physical displays, drones, robots, augmented reality wearable displays, speakers, audio outputs, haptic surfaces, odor generation outputs, and wearable device environmental outputs.

Example 39 may include the at least one computer readable storage medium of any one of Examples 31 to 38, wherein if the incidences are relatively minimal, the length of time of the interaction is relatively short and placement of the one or more user interfaces is for a relatively short period of time, further instructions, when executed, cause the computing system to position the one or more user interfaces in a location having a relatively high convenience to a user performing the task.

Example 40 may include the at least one computer readable storage medium of any one of Examples 31 to 38, wherein if there are multiple incidences, the length of time of interaction is relatively long and placement of the one or more user interfaces is for a relatively long period of time, further instructions, when executed, cause the computing system to position the one or more user interfaces in a location that provides a relatively high ergonomic result to a user performing the task.

Example 41 may include the at least one computer readable storage medium of Example 31, comprising further instructions, which when executed by the computing system, cause the computing system to continuously monitor the smart workspace for movement or changes by the user(s), update an activity history database with information about the task and the one or more user interfaces used, and if needed, update user profiles.

Example 42 may include the at least one computer readable storage medium of Example 41, wherein if the one or more user interfaces need to be changed based on movements or changes, the instructions, when executed, further cause the computing system to perform the task modeling to select one or more replacement user interfaces.

Example 43 may include the apparatus of Example 11, wherein the logic coupled to the substrate further to continuously monitor the smart workspace for movement or changes by the user(s), update an activity history database with information about the task and the one or more user interfaces used, and if needed, update user profiles.

Example 44 may include the apparatus of Example 43, wherein if the one or more user interfaces need to be changed based on movements or changes, the logic coupled to the substrate further to perform the task modeling to select one or more replacement user interfaces.

Example 45 may include the method of Example 21, further comprising continuously monitoring the smart workspace for movement or changes by the user(s), updating an activity history database with information about the task and the one or more user interfaces used, and if needed, updating user profiles.

Example 46 may include the method of Example 45, wherein if the one or more user interfaces need to be changed based on movements or changes, the method further comprising performing the task modeling to select one or more replacement user interfaces.

Example 47 may include the ergonomic control system of Example 1, comprising further instructions, which when executed by the computing system, cause the computing system to continuously monitor the smart workspace for movement or changes by the user(s), update an activity history database with information about the task and the one or more user interfaces used, and if needed, update user profiles.

Example 48 may include the ergonomic control system of Example 47, wherein if one or more user interfaces need to be changed based on movements or changes, the instructions, when executed, further cause the computing system to perform the task modeling to select one or more replacement user interfaces.

Example 49 may include at least one computer readable medium comprising a set of instructions, which when executed by a computing system, cause the computing system to perform the method of any one of Examples 21 to 30 and 45 to 46.

Example 50 may include an apparatus comprising means for performing the method of any one of Examples 21 to 30 and 45 to 46.

Example 51 may include the ergonomic control system of Example 1, wherein the one or more interfaces include one or more inputs or outputs.

Example 52 may include the ergonomic control system of Example 51, wherein the one or more inputs or outputs include one or more projected inputs or outputs.

Example 53 may include the apparatus of Example 11, wherein the one or more interfaces include one or more inputs or outputs.

Example 54 may include the apparatus of Example 53, wherein the one or more inputs or outputs include one or more projected inputs or outputs.

Example 55 may include the method of Example 21, wherein the one or more interfaces include one or more inputs or outputs.

Example 56 may include the method of Example 55, wherein the one or more inputs or outputs include one or more projected inputs or outputs.

Example 57 may include the at least one computer readable storage medium of Example 31, wherein the one or more interfaces include one or more inputs or outputs.

Example 58 may include the at least one computer readable storage medium of Example 57, wherein the one or more inputs or outputs include one or more projected inputs or outputs.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe Example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For Example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular Examples thereof, the true scope of the embodiments should not be so limited since other modifications will become apparent to the skilled practitioner upon a study of the drawings, specification, and following claims.

What is claimed is:

1. A system comprising:
   network interface circuitry to receive sensor input data from a plurality of input sensor devices;
   a processor coupled to the network interface circuitry;
   one or more memory devices coupled to the processor, the one or more memory devices including instructions, which when executed by the processor, cause the system to:
   determine a task to be performed in a smart work space;
   perform task modeling, wherein the task modeling includes to determine one or more user interfaces involved with the task, determine what information is to be displayed to perform the task, determine what inputs a user is to provide to the system to perform the task, and estimate an incidence of an interaction and a length of time of the interaction;
   determine one or more placements for the one or more user interfaces based on one or more ergonomic conditions, the incidence of the interaction, and the length of time of the interaction; and
   position the one or more user interfaces into the smart work space in accordance with the determined one or more placements.

2. The system of claim 1, wherein the instructions, when executed, cause the system to predict user postures to perform the interaction using user profile information and task modeling information, wherein if the user does not have a user profile, the instructions, when executed, further cause the system to create the user profile for the user.

3. The system of claim 1, wherein the instructions to cause the system to perform the task modeling further includes instructions to cause the system to:
   create a list of potential interaction alternatives based on convenience of the one or more user interfaces.

4. The system of claim 3, wherein the instructions, when executed, cause the system to evaluate each of the potential interaction alternatives on the list to determine whether any safety hazards are involved, wherein if a potential interaction alternative includes at least one safety hazard, the instructions, when executed, further cause the system to remove the potential interaction alternative from the list.

5. The system of claim 4, wherein each of the potential interaction alternatives on the list is weighted and scored as a function of the incidence of the interaction, the length of time of the interaction, a posture health parameter, a user convenience parameter, and a hazard parameter, wherein the potential interaction alternatives with highest scores are used as the one or more user interfaces.

6. The system of claim 1, wherein the instructions to cause the system to estimate the incidence and the length of time of the interaction include further instructions, that when executed, cause the system to review entries of similar tasks in an activity history database, the activity history database includes information on how long previous interactions took and how long the user held a specific posture while performing the interaction and if any injuries occurred based on the specific posture.

7. The system of claim 1, wherein if the incidences are relatively minimal, the length of time of the interaction is relatively short and placement of the one or more user interfaces is for a relatively short period of time, further instructions, when executed, cause the system to position the one or more user interfaces in a location having a relatively high convenience to the user performing the task.

8. The system of claim 1, wherein if there are multiple incidences, the length of time of interaction is relatively long and placement of the one or more user interfaces is for a relatively long period of time, further instructions, when executed, cause the system to position the one or more user interfaces in a location that provides a relatively high ergonomic result to the user performing the task.

9. An apparatus comprising:
a substrate; and
logic coupled to the substrate, wherein the logic includes one or more of configurable logic or fixed-functionality hardware logic, the logic coupled to the substrate to:
determine a task to be performed in a smart work space;
perform task modeling, wherein the task modeling includes to determine one or more user interfaces involved with the task, determine what information is to be displayed to perform the task, determine what inputs a user is to provide to the apparatus to perform the task, and estimate an incidence of an interaction and a length of time of the interaction;
determine one or more placements for the one or more user interfaces based on one or more ergonomic conditions, the incidence of the interaction, and the length of time of the interaction; and
position the one or more user interfaces into the smart work space in accordance with the determined one or more placements.

10. The apparatus of claim 9, wherein the logic coupled to the substrate is to perform posture modeling, wherein posture modeling includes predicting user postures to perform the interaction using user profile information and task modeling information, wherein if the user does not have a user profile, the logic coupled to the substrate is to create the user profile for the user.

11. The apparatus of claim 9, wherein the logic coupled to the substrate to perform the task modeling further includes logic coupled to the substrate to:
create a list of potential interaction alternatives based on convenience of the one or more user interfaces.

12. The apparatus of claim 11, wherein the logic coupled to the substrate is to evaluate each of the potential interaction alternatives on the list to determine whether any safety hazards are involved, wherein if a potential interaction alternative includes at least one safety hazard, the logic coupled to the substrate is to remove the potential interaction alternative from the list.

13. The apparatus of claim 12, wherein each of the potential interaction alternatives on the list is weighted and scored as a function of the incidence of the interaction, the length of time of the interaction, a posture health parameter, a user convenience parameter, and a hazard parameter, wherein the potential interaction alternatives with highest scores are used as the one or more user interfaces.

14. The apparatus of claim 9, wherein the logic coupled to the substrate to estimate the incidence and the length of time of the interaction includes logic coupled to the substrate to review entries of similar tasks in an activity history database, the activity history database includes information on how long previous interactions took and how long the user held a specific posture while performing the interaction and if any injuries occurred based on the specific posture.

15. The apparatus of claim 9, wherein the logic coupled to the substrate further to:
continuously monitor the smart workspace for movement or changes by the user(s);
update an activity history database with information about the task and the one or more user interfaces used; and
if needed, update user profiles.

16. The apparatus of claim 15, wherein if the one or more user interfaces need to be changed based on movements or changes, the logic coupled to the substrate further to perform the task modeling to select one or more replacement user interfaces.

17. A method of providing smart work spaces in ubiquitous computing environments, comprising:
determining a task to be performed in a smart work space;
performing task modeling, wherein the task modeling includes determining one or more user interfaces involved with the task, determining what information is to be displayed to perform the task, determining what inputs a user is to provide to perform the task, and estimating an incidence of an interaction and a length of time of the interaction;
determining one or more placements for the one or more user interfaces based on one or more ergonomic conditions, the incidence of the interaction, and the length of time of the interaction; and
positioning the one or more user interfaces into the smart work space in accordance with the determined one or more placements.

18. The method of claim 17, further comprising performing posture modeling, wherein posture modeling includes predicting user postures to perform the interaction using user profile information and task modeling information, wherein if the user does not have a user profile, the method further comprising creating the user profile.

19. The method of claim 17, wherein the task modeling further includes:
creating a list of potential interaction alternatives based on convenience of the one or more user interfaces.

20. The method of claim 19, further comprising evaluating each of the potential interaction alternatives on the list to determine whether any safety hazards are involved, wherein if a potential interaction alternative includes at least one safety hazard, removing the potential interaction alternative from the list.

21. The method of claim 20, wherein each of the potential interaction alternatives on the list is weighted and scored as a function of the incidence of the interaction, the length of time of the interaction, a posture health parameter, a user convenience parameter, and a hazard parameter, wherein the potential interaction alternatives with highest scores are used as the one or more user interfaces.

22. The method of claim 17, wherein if the incidences are relatively minimal, the length of time of the interaction is relatively short and placement of the one or more user interfaces is for a relatively short period of time, positioning the one or more user interfaces in a location having a relatively high convenience to ft the user performing the task.

23. The method of claim 17, wherein if there are multiple incidences, the length of time of interaction is relatively long and placement of the one or more user interfaces is for a relatively long period of time, positioning the one or more user interfaces in a location that provides a relatively high ergonomic result to the user performing the task.

24. The method of claim 17, wherein user interface inputs include one or more of projected input devices, dynamic touch surfaces, keyboards, and wearable device environmental inputs.

25. The method of claim 17, wherein user interface outputs include one or more of projected images, projected displays, physical displays, drones, robots, augmented reality wearable displays, speakers, audio outputs, haptic surfaces, odor generation outputs, and wearable device environmental outputs.

* * * * *